(12) United States Patent
Horn

(10) Patent No.: US 10,414,245 B2
(45) Date of Patent: Sep. 17, 2019

(54) VEHICLE VENTILATION SYSTEM

(71) Applicant: David Horn, Falling Waters, WV (US)

(72) Inventor: David Horn, Falling Waters, WV (US)

(*) Notice: Subject to any disclaimer, the term of this patent is extended or adjusted under 35 U.S.C. 154(b) by 150 days.

(21) Appl. No.: 14/824,770

(22) Filed: Aug. 12, 2015

(65) Prior Publication Data

US 2016/0046173 A1 Feb. 18, 2016

Related U.S. Application Data

(60) Provisional application No. 62/036,281, filed on Aug. 12, 2014.

(51) Int. Cl.
*B60H 1/24* (2006.01)
*B60H 1/00* (2006.01)

(52) U.S. Cl.
CPC ......... *B60H 1/245* (2013.01); *B60H 1/00428* (2013.01); *Y02T 10/88* (2013.01)

(58) Field of Classification Search
CPC ...... B60H 1/00428; B60H 1/245; Y02T 10/88
USPC .................................. 454/75, 129, 136, 138
See application file for complete search history.

(56) References Cited

U.S. PATENT DOCUMENTS

| | | | |
|---|---|---|---|
| 2,553,262 A | 5/1951 | Lehane et al. | |
| 3,943,726 A | 3/1976 | Miller | |
| 5,038,674 A * | 8/1991 | Merges | B60H 1/00428 296/211 |
| 5,156,568 A * | 10/1992 | Ricci | B60H 1/00464 454/129 |
| 5,344,361 A * | 9/1994 | Matthias | B60H 1/00428 136/291 |
| 5,826,435 A | 10/1998 | Hange | |
| 6,588,833 B2 * | 7/2003 | Strommer | B60H 1/00464 296/214 |
| 6,662,572 B1 | 12/2003 | Howard | |
| 6,712,133 B1 | 3/2004 | Kyrtsos et al. | |
| 6,808,450 B2 * | 10/2004 | Snow | B60H 1/00428 454/137 |
| 6,949,021 B2 * | 9/2005 | Ichishi | B60H 1/004 165/288 |
| 7,027,912 B1 | 4/2006 | Metzger | |
| 8,560,124 B2 | 10/2013 | Oakes | |
| 2007/0298702 A1 * | 12/2007 | Boxum | B60H 1/00364 454/129 |
| 2009/0130966 A1 * | 5/2009 | Tucker | B60H 1/248 454/75 |
| 2009/0277190 A1 | 11/2009 | Piette | |

* cited by examiner

*Primary Examiner* — Gregory L Huson
*Assistant Examiner* — Dana K Tighe
(74) *Attorney, Agent, or Firm* — Global Intellectual Property Agency, LLC; Daniel Boudwin

(57) ABSTRACT

A vehicle ventilation system is provided to exhaust hot air from the interior of a motor vehicle to the ambient environment. The vehicle ventilation system includes a roof vent having an elongated housing pivotally disposed on a roof of a motor vehicle, wherein the roof vent is movable between an open and a closed configuration. A fan assembly is disposed within the opening and serves to exhaust hot air from the interior of the vehicle. Further, one or more front seat vents are provided that allow cool air to flow into the vehicle as hot air escapes through the roof vent. The vehicle ventilation system further includes a control circuit having a temperature sensor configured to actuate the roof panel and front seat vents when a predetermined temperature is reached.

8 Claims, 4 Drawing Sheets

VEHICLE VENTILATION SYSTEM

CROSS REFERENCE TO RELATED APPLICATION

This application claims the benefit of U.S. Provisional Application No. 62/036,281 filed on Aug. 12, 2014. The above identified patent application is herein incorporated by reference in its entirety to provide continuity of disclosure.

FIELD OF THE INVENTION

The present invention relates to motor vehicles. More specifically, the present invention relates to a vehicle ventilation system that helps to cool the interior of a vehicle by inducing air flow from the interior of the vehicle to the ambient environment when the passenger compartment becomes heated during periods of warm weather.

BACKGROUND OF THE INVENTION

When a car is parked and unattended, windows of a motor vehicle are often rolled up to prevent access to the passenger compartment of the motor vehicle by intruders or thieves. During the summer, the motor vehicle is often exposed to heat and sunlight when not parked in a garage or covered area. High temperatures within the vehicle can render the vehicle unfit for occupancy by humans or animals. If a child or animal is accidentally locked inside of a vehicle the child or animal can suffer from heat related injuries and illnesses.

Additionally, excessive heat within the vehicle may cause permanent damage to the interior of the motor vehicle. For example, a motor vehicle having leather seats may crack or become faded due to the heat. In addition, if food or other items are stored within the passenger compartment may spoil and become inedible. Therefore, there exists a need to provide a vehicle ventilation system that helps to cool the interior of the vehicle once a predetermined temperature has been reached, indicating that the interior of the vehicle has become excessively hot.

Devices have been disclosed in the prior art that relate to ventilation systems and roof vents for vehicles. These include devices that have been patented and published in patent application publications. Such devices include U.S. Pat. No. 5,038,674 issued to Merges which provides an auxiliary fan unit located in the roof of an automobile. The Merges device includes a fan connected to a panel that can be pushed into an open position to provide an opening in the roof of the car. Although the Merges fan unit can circulate air through the passenger compartment, the Merges device does not include a heat sensor or a solar panel.

U.S. Pat. No. 5,344,361 to Matthias provides a portable auxiliary fan unit that can be installed into the sunroof of an automobile to exhaust the air from the passenger compartment of the vehicle; U.S. Pat. No. 4,800,803 issued to Farmont discloses a sunroof having an auxiliary fan powered by photovoltaic cells; and U.S. Pat. No. 5,003,866 to Ricci discloses a portable fan unit, which can be installed into the sunroof of a car that is powered by solar cells. These devices, however, fail to provide a vehicle ventilation system having a temperature sensor that is configured to activate a fan assembly and actuate a roof panel to expose an opening or vent, and that also opens one or more front seat vents to allow cool air to enter the vehicle.

The present invention provides a vehicle ventilation system having a roof panel disposed on a roof of a motor vehicle configured to retract to expose an opening configured to induce air flow between the passenger compartment of the motor vehicle and the ambient environment. A fan assembly is disposed within the opening having a fan powered by a motor adapted to exhaust hot air from the passenger compartment. One or more front seat vents are also provided that allow cool air to flow into the vehicle as hot air escapes therefrom through the roof vent. The vehicle ventilation system includes a control circuit having a temperature sensor configured to actuate the roof panel, fan assembly, and front seat vents when a predetermined temperature is reached. At least one solar panel is disposed on the roof of the vehicle to provide power for the vehicle ventilation system.

It is therefore submitted that the present invention is substantially divergent in design elements from the prior art, and consequently it is clear that there is a need in the art for an improvement to vehicle ventilation systems. In this regard, the instant invention substantially fulfills these needs.

SUMMARY OF THE INVENTION

In view of the foregoing disadvantages inherent in the known types of vehicle ventilation systems now present in the prior art, the present invention provides a vehicle ventilation system wherein the same can be utilized for inducing air flow between the passenger compartment of a motor vehicle and the ambient environment.

It is therefore an object of the invention to provide a new and improved vehicle ventilation system that has all of the advantages of the prior art and none of the disadvantages.

Another object of the present invention is to provide a new and improved vehicle ventilation system comprising a roof panel configured to expose an opening on the roof of a motor vehicle.

Yet another object of the present invention is to provide a new and improved vehicle ventilation system, wherein a fan assembly is disposed within the opening of the roof vent configured to induce air flow between the passenger compartment of the motor vehicle and the ambient environment.

A further object of the invention is to provide a vehicle ventilation system having one or more front seat vents adapted to allow cool air to flow into the interior of the vehicle while hot air escapes through the roof vent.

Still yet another object of the present invention is to provide a new and improved vehicle ventilation system comprising a control circuit having a temperature sensor configured to actuate the roof vent, fan assembly, and front seat vents to help cool the interior of the vehicle.

A further object of the present invention is to provide a new and improved vehicle ventilation system, wherein the fan assembly includes a fan rotatably driven via a motor configured to exhaust hot air form the passenger compartment.

Another object of the present invention is to provide a new and improved vehicle ventilation system, further comprising one or more solar panels configured to power the vehicle ventilation system.

Still yet another object of the present invention is to provide a new and improved vehicle ventilation system, wherein the device may be readily fabricated from materials that permit relative economy and are commensurate with durability.

Other objects, features, and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
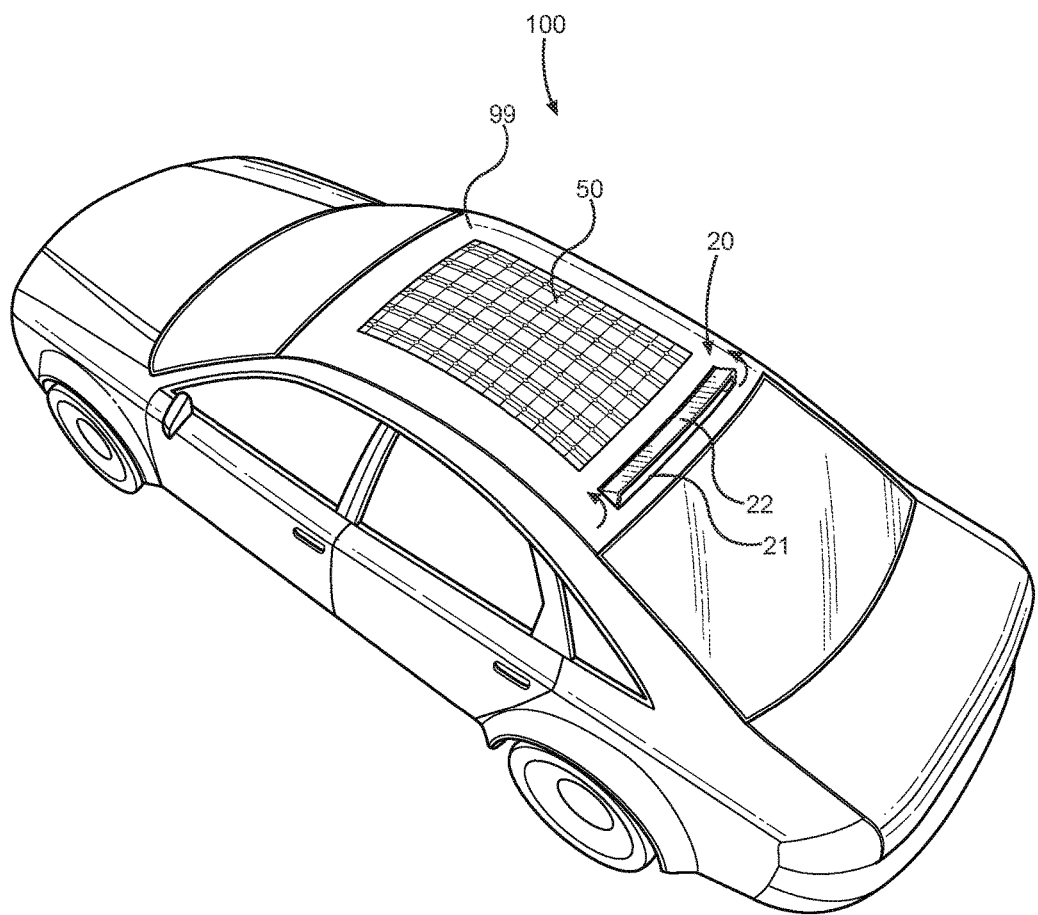
FIG. 1 shows an overhead perspective of the vehicle ventilation system.

Reference is made herein to the attached drawings. Like reference numerals are used throughout the drawings to depict like or similar elements of the vehicle ventilation system. For the purposes of presenting a brief and clear description of the present invention, the preferred embodiment will be discussed as used for inducing air flow between the passenger compartment of a motor vehicle and the ambient environment. The figures are intended for representative purposes only and should not be considered to be limiting in any respect.

Referring now to FIG. 1, there is shown an overhead perspective of the vehicle ventilation system as installed on a vehicle roof. The vehicle ventilation system 20 comprises a roof vent 22 adapted to be installed on the roof 99 of a vehicle 100. The roof vent 22 is shown as being positioned towards the rear of the vehicle, however, in alternate embodiment, the roof vent 22 can be placed on various portions of the roof 99. Further, the roof vent 22 is preferably positioned transversely relative to the longitudinal axis of the vehicle, such that the roof vent 22 extends from the left half of the vehicle to the right half thereof.

The roof vent 22 is integrated into the roof 99 of the vehicle 100 or may be retrofitted into the roof 99 of a vehicle by removing a section of the vehicle's roof 99 and replacing the section of the vehicle roof 99 with the roof vent 22. The roof vent 22 comprises an elongated housing having a front side and a rear side. The front side is pivotally affixed to the roof 99 of the vehicle 100. The rear side 21 comprises an opening that provides fluid communication from the exterior of the vehicle 100 to the interior of the vehicle. The roof vent 22 can pivot between an open and closed configuration. A motor or other actuator is provided for automatically moving the roof vent 22 between the open and closed configurations. In the closed configuration, the roof vent 22 is flush with the roof 99 of the vehicle and no air can pass through the roof vent 22 from the ambient environment into the vehicle or vice versa. In the open configuration, the roof vent 22 is pivoted so that the opening 21 provides fluid communication between the exterior and interior of the vehicle so as to allow air to escape from the interior of the vehicle.

It is not desired at the present disclosure to limit the means of actuating the roof panel to expose the opening on the roof of the motor vehicle. Rather, it is desired to disclose and claim a functional roof panel that is configured to obtain the results and advantages described in the present disclosure, specifically, a roof panel configured to be actuated to expose the opening on the roof of the motor vehicle. It is anticipated that those of ordinary skill in the art presented with this disclosure will readily envision a variety of means that are suitable to actuate the roof panel to provide for the advantages and results described herein. These modifications and variations are deemed within the spirit and scope of the present disclosure.

Figure 2:
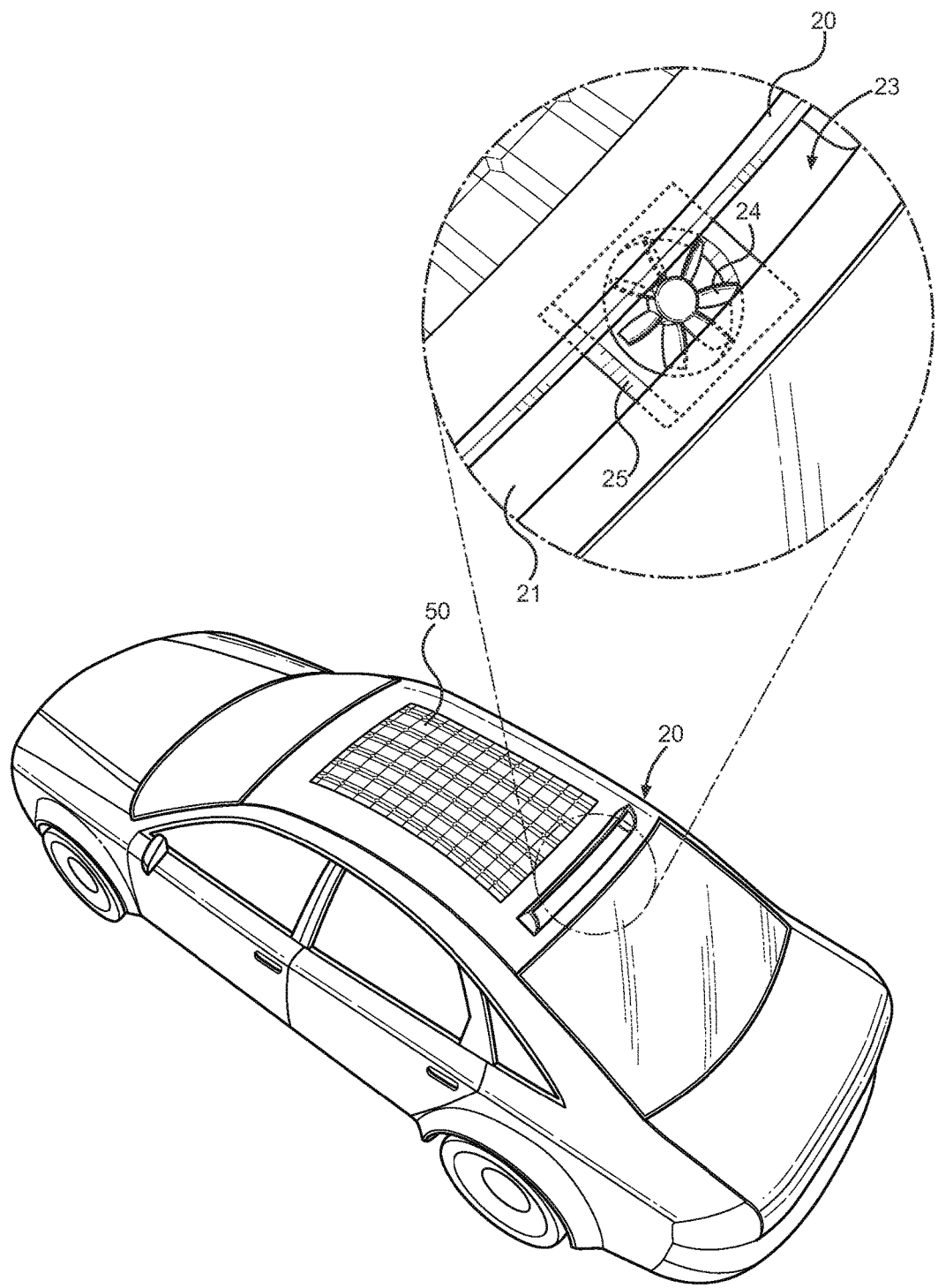
FIG. 2 shows an overhead perspective of the fan assembly of the vehicle ventilation system.

Referring now to FIG. 2, there is shown an overhead perspective of the roof vent. The vehicle ventilation system 20 further comprises a fan assembly 23 that is positioned within the opening 21 of the roof vent. The fan assembly 23 includes a fan 24 that is disposed within the opening 21 configured to exhaust air from the passenger compartment of the motor vehicle to the ambient environment. Preferably, the fan 24 does not extend past the inner ceiling of the passenger compartment, so that the roof vent does not occupy head space within the passenger compartment.

The fan 24 is configured to be rotatably driven via a motor 25. Preferably, the motor 25 is powered via one or more solar panels 50 composed of a plurality of photovoltaic cells. The solar panels 50 are adapted to be disposed on the roof 99 of the motor vehicle 100. In this way, the solar panels 50 are able to receive direct sunlight while the vehicle is parked or while the vehicle is in use. The solar power generated from the solar panels 50 is preferably stored within a battery 28 configured to provide power to drive the fan assembly 23. It is contemplated that the fan 24 can be rotatably driven by either a DC or AC motor, wherein it is also likewise contemplated that the fan assembly 23 would include the property circuitry to convert the DC power from the at least one solar panel 50 to an alternating current if an AC motor is used in the roof vent.

Figure 3:
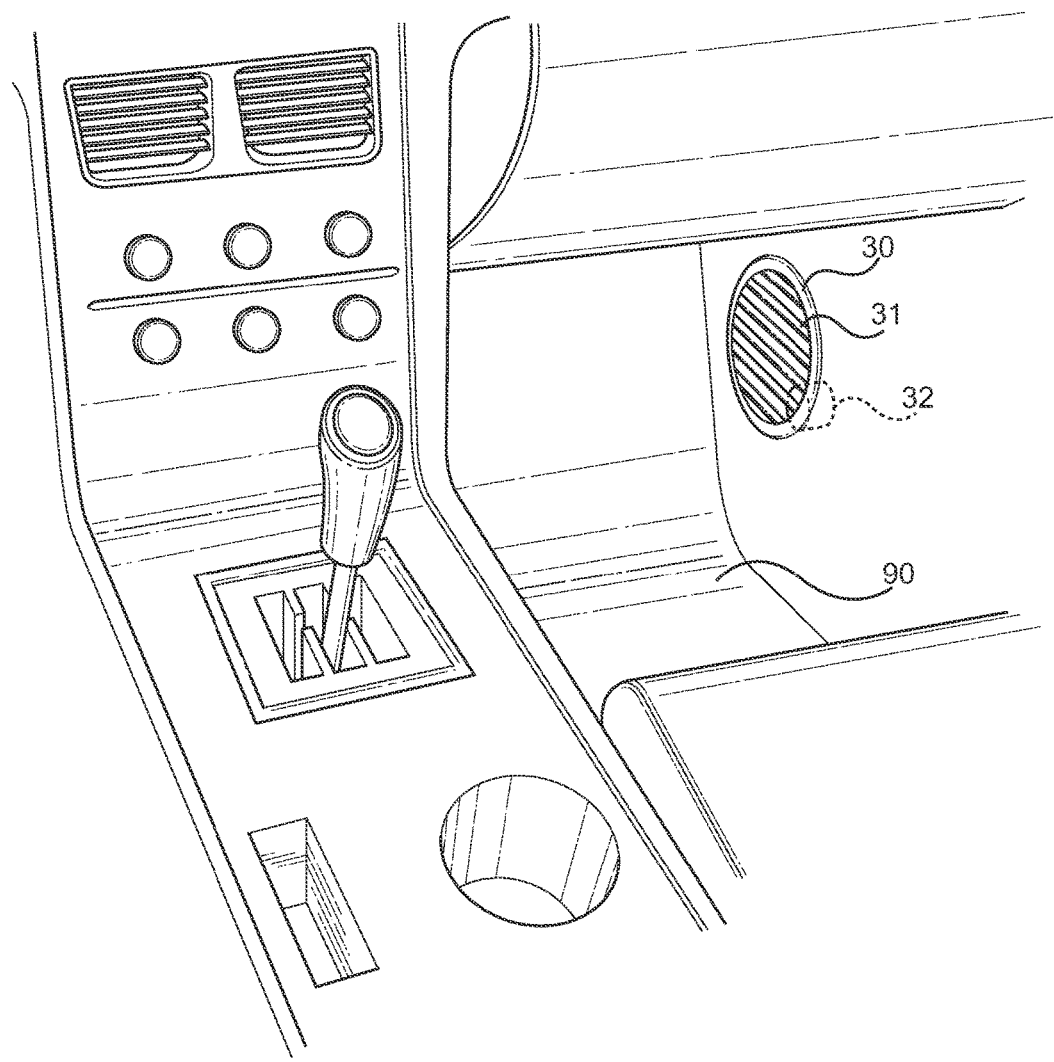
FIG. 3 shows a view of a front seat vent of the vehicle ventilation system.

Referring now to FIG. 3, there is shown a view of a front seat vent of the vehicle ventilation system. The vehicle ventilation system further comprises one or more front seat vents 30 adapted to allow air from the ambient environment to flow into the interior of the vehicle. The front seat vents 30 are preferably positioned in the interior of the front 90 of the vehicle and adjacent to the floor thereof. The front seat vents 30 can be arranged adjacent to the driver seat and front passenger seat. The front seat vent 30 comprises one or more dampers 31 that can be actuated so as to open or close the vent 30. Preferably, the dampers 31 are automatically actuated via a damper motor 32 operably connected thereof.

Figure 4:
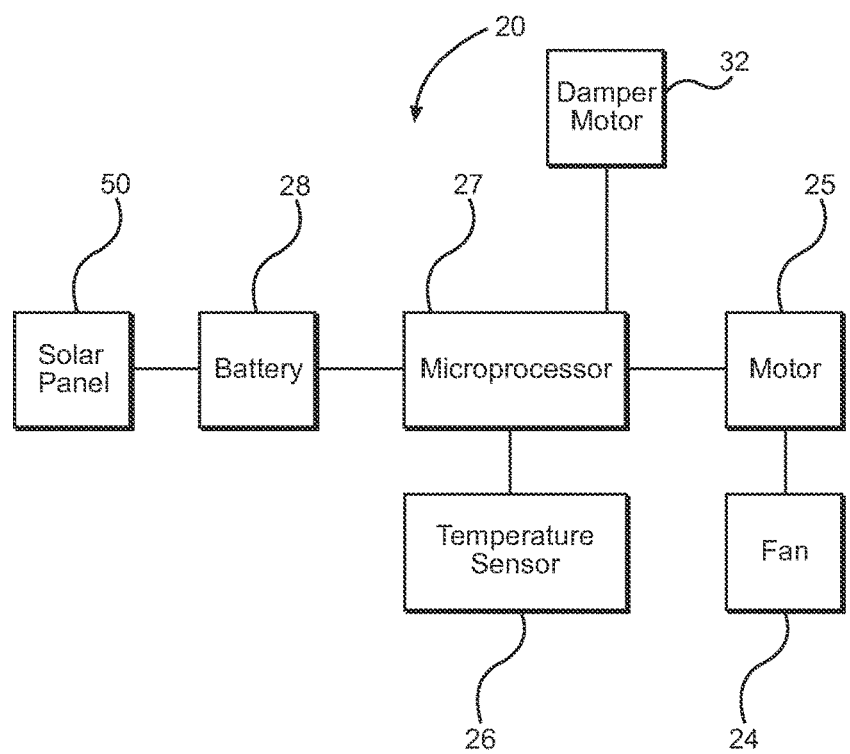
FIG. 4 shows a schematic diagram of the vehicle ventilation system.

Referring now to FIG. 4, there is shown a schematic diagram of the vehicle ventilation system. The vehicle ventilation system further comprises a control circuit having a microprocessor and a temperature sensor 26, wherein the temperature sensor is adapted to determine the temperature within the interior of the vehicle. In operation, the temperature sensor 26 monitors the temperature within the vehicle and determines if a predetermined temperature is reached, indicating that the interior of the vehicle is too hot and not safe for occupancy.

If the temperature reaches the predetermined temperature, the control circuit is adapted to actuate the roof panel into the open configuration, and activate the motor 25 of the fan 24 so as to exhaust air from the vehicle. In this way, the fan 24 can exhaust air from within the passenger compartment to the ambient environment to help cool the passenger compartment.

Further, the control circuit is adapted to cause the front seat vents to open by controlling the damper motor 32. Once the front seat vents are opened, cool air from the exterior of the vehicle can flow into the interior of the vehicle, while hot air escapes from the roof vent of the vehicle. In this way, the interior of the vehicle can be cooled to a comfortable temperatures safe for occupancy by people or animals.

The temperature sensor 26 is also configured to return the roof panel and deactivate the motor 25, thereby deactivating the fan 24 when the temperature within the passenger compartment reaches a second predetermined temperature corresponding to a cool or comfortable temperature for passengers of the vehicle. Further, the front seat vents are closed so that air ceases flowing into the vehicle. Preferably, the temperature sensor 26 is a fixed temperature heat detector, however it is anticipated that those of ordinary skill in the art will readily envision a variety of other suitable heat detectors that can achieve the results and advantages described herein. These modifications and variations do not alter the spirit of the present disclosure and deemed within the scope of the present disclosure.

In some embodiments, the fan assembly 23 is electrically connected to the vehicle's battery as an alternative source of electrical power. Further, the vehicle may utilize electrical energy collected and produced by the solar panels on the roof of the vehicle.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle ventilation system, comprising:
   an elongated housing having an opening thereon, wherein said elongated housing is adapted to be installed on a roof of a vehicle, wherein said elongated housing is moveable between an open configuration and a closed configuration, wherein said elongated housing is configured to be flush with said roof of said vehicle when said elongated housing is in said closed configuration;
   a housing motor operably connected to said elongated housing, wherein said housing motor is adapted to move said elongated housing between said open configuration and said closed configuration;
   wherein the housing motor is independently operable from a power source of the vehicle, such that the housing motor is operable when the vehicle is stationary and when the vehicle is not running;
   said opening providing fluid communication between an interior and an exterior of said vehicle when said elongated housing is in said open configuration;
   a fan assembly disposed within said opening configured to exhaust air from said interior of said vehicle, said fan assembly including a fan rotatably driven by a fan motor, wherein said fan assembly is disposed entirely above an inner ceiling of said interior of said vehicle;
   a temperature sensor adapted to determine a temperature of said interior of said vehicle;
   a control circuit adapted to move said elongated housing in said open configuration and activate said fan assembly when said temperature sensor determines said temperature of said interior of said vehicle has reached a first predetermined temperature, said control circuit further adapted to move said elongated housing to said closed configuration and deactivate said fan assembly when said temperature sensor determines said temperature of said interior of said vehicle has reached a second predetermined temperature;
   one or more front seat vents adapted to be positioned on an interior of said vehicle, wherein said one or more front seat vents allow air to pass therethrough, wherein the air is entirely supplied from ambient air disposed on an exterior of the vehicle.

2. The vehicle ventilation system of claim 1, wherein said control circuit comprises a microprocessor in communication with said temperature sensor and further in communication with said fan motor and said housing motor.

3. The vehicle ventilation system of claim 1, further comprising one or more solar panels adapted to provide electricity to said vehicle ventilation system.

4. The vehicle ventilation system of claim 3, wherein said fan assembly further comprises a battery adapted to store energy generated by said one or more solar panels.

5. The vehicle ventilation system of claim 1, wherein said one or more front seat vents comprise one or more dampers for selectively opening and closing said one or more front seat vents.

6. The vehicle ventilation system of claim 5, wherein said one or more dampers are automatically actuated via a damper motor.

7. The vehicle ventilation system of claim 1, wherein said front seat vents are disposed on a bottom portion of a door of said vehicle.

8. A vehicle ventilation system, consisting of:
   an elongated housing having an opening thereon, wherein said elongated housing is adapted to be installed on a roof of a vehicle, wherein said elongated housing is moveable between an open configuration and a closed configuration, wherein said elongated housing is configured to be flush with said roof of said vehicle when said elongated housing is in said closed configuration;
   a housing motor operably connected to said elongated housing, wherein said housing motor is adapted to move said elongated housing between said open configuration and said closed configuration;
   wherein the housing motor is independently operable from a power source of the vehicle, such that the housing motor is operable when the vehicle is stationary and when the vehicle is not running;
   said opening providing fluid communication between an interior and an exterior of said vehicle when said elongated housing is in said open configuration;
   a fan assembly disposed within said opening configured to exhaust air from said interior of said vehicle, said fan assembly including a fan rotatably driven by a fan motor, wherein said fan assembly is disposed entirely above an inner ceiling of said interior of said vehicle;
   a temperature sensor adapted to determine a temperature of said interior of said vehicle;
   a control circuit adapted to move said elongated housing in said open configuration and activate said fan assembly when said temperature sensor determines said temperature of said interior of said vehicle has reached a first predetermined temperature, said control circuit further adapted to move said elongated housing to said closed configuration and deactivate said fan assembly when said temperature sensor determines said temperature of said interior of said vehicle has reached a second predetermined temperature;

one or more front seat vents adapted to be positioned on an interior of said vehicle, wherein said one or more front seat vents allow air to pass therethrough, wherein the air is entirely supplied from ambient air disposed on an exterior of the vehicle.

* * * * *